(12) United States Patent
Malavasi et al.

(10) Patent No.: US 7,910,076 B2
(45) Date of Patent: Mar. 22, 2011

(54) PROCESS FOR THE PURIFICATION OF COMBUSTION FUMES

(75) Inventors: Massimo Malavasi, Milan (IT); Grazia Di Salvia, Bologna (IT); Edoardo Rossetti, Bologna (IT)

(73) Assignee: ITEA S.p.A., Bologna (IT)

( * ) Notice: Subject to any disclaimer, the term of this patent is extended or adjusted under 35 U.S.C. 154(b) by 0 days.

(21) Appl. No.: 12/519,501

(22) PCT Filed: Dec. 19, 2007

(86) PCT No.: PCT/EP2007/011193
§ 371 (c)(1),
(2), (4) Date: Jun. 16, 2009

(87) PCT Pub. No.: WO2008/080561
PCT Pub. Date: Jul. 10, 2008

(65) Prior Publication Data
US 2010/0051872 A1     Mar. 4, 2010

(30) Foreign Application Priority Data

Dec. 28, 2006 (IT) .............................. MI2006A2524

(51) Int. Cl.
*B01D 53/64* (2006.01)
(52) U.S. Cl. ...................................... 423/210
(58) Field of Classification Search ................ 423/210
See application file for complete search history.

(56) References Cited

U.S. PATENT DOCUMENTS

| 4,443,417 A | 4/1984 | Wiklund |
| 4,620,492 A | 11/1986 | Vogg et al. |
| 4,873,065 A * | 10/1989 | Braun et al. ................ 423/210 |

FOREIGN PATENT DOCUMENTS

| DE | 42 29 662 A1 | * | 3/1994 |
| DE | 42 41 726 C1 | * | 3/1994 |
| EP | 212855 A1 | * | 3/1987 |
| EP | 509258 A1 | * | 10/1992 |
| EP | 706815 A2 | * | 4/1996 |

* cited by examiner

*Primary Examiner* — Timothy C Vanoy
(74) *Attorney, Agent, or Firm* — Arent Fox LLP

(57) ABSTRACT

A process for the removal of heavy metals from flue gas deriving from combustion processes comprising the following steps: a) optional removal by filtration of solid particles or of particulate of heavy metals or their compounds, having an average diameter higher than 10 micron; b) flue gas washing performed with an aqueous phase and transfer of the heavy metals or their compounds to the aqueous phase; c) flue gas cooling and partial condensation of the steam contained in the flue gas and separation of a condensed phase; d) discharge of the flue gases substantially free from heavy metals or their compounds into the environment; f) discharge of the aqueous phase substantially free from heavy metals or their compounds into the environment.

38 Claims, No Drawings

PROCESS FOR THE PURIFICATION OF COMBUSTION FUMES

CROSS-REFERENCE TO RELATED APPLICATION

This application is a National Stage entry of International Application No. PCT/EP2007/011193, filed Dec. 19, 2007, the entire specification and claims of which are incorporated herewith by reference.

The present invention relates to a process for the treatment of flue gas produced by combustion processes, or of synthetic gas produced by gasification processes, for the substantially complete removal of heavy metals and/or their compounds as defined by the European provisions EC 2000/76 for the refuse incineration. The relevant limit as defined in EC 2000/76 is of 500 µg/Nm$^3$ for the total amount of heavy metals, excluding Hg, Cd and Tl. For the latters, the limit for Hg is 50 µg/Nm$^3$ and for the sum Cd+Tl the limit is 50 µg/Nm$^3$. Said regulation is taken as a reference since it is the most strict until now among the heavy metals emission regulations.

According to the above mentioned EC regulation, the measured concentrations of heavy metals, obtained by isokinetic sampling of flue gases, are referred to the dry flue gas (dehumidified). The concentration limits reported in the regulation are applied to the dry combustion gas for a combustion process using air, and are univocally linked to the mass balance concept for emissions, by fixing the oxygen concentration in the flue gas at 11% by volume. The regulation specifies the correction (normalization) coefficient in case of oxygen concentration different from 11% by volume, to maintain mass balance concept. The regulation specifies furthermore that in case of combustion with comburent different from air, for example enriched air or oxygen, correction coefficients are case by case applied according to the mass balance criterium.

The mass balance concept is universally accepted. For example the merit classification BAT (Best Available Technology) for emissions is directly figured out along mass balance.

More specifically the present invention relates to a process wherein heavy metals and/or their compounds contained in flue gases are not discharged into the environment but are recovered, and can be used as raw material in industries, for example in steel industries.

Still more specifically the process of the invention allows the substantially complete removal, as specified above, of all heavy metals and/or their compounds, such as for example mercury, cadmium, nickel and copper, and those metals, for example vanadium, nickel and chromium, the removal of which from the fuel gases results very difficult with the techniques at present used.

The process of the present invention can be used also when metals or their compounds are present in flue gas under the form of compounds having an organized molecular structure, such that formed when metals or their compounds are subjected to a sintering process. This takes place when the combustion producing the flue gas is carried out at a high temperature, in particular higher than 850° C., preferably higher than 1,100° C.

It is known in the prior art that flue gas deriving from combustion processes contains heavy metals and/or their compounds, given that all the usable fuel materials contain heavy metals. This is true for both fossil fuels, for example coal, oil, natural gas, heavies derived from crude refining, bituminous scists, etc., and for the non-fossil ones, such as for example biomasses, municipal or industrial wastes. The heavy metal content depends on the kind of used fuel. It is well known that these metals can be present in flue gas both in gaseous form and also as liquid and/or solid particles of a variable size, so that to be stably dispersed in the flue gas. As a matter of fact the particles can be very small, with a particle diameter down to the order of nanometer. However the particle size can be larger than this and can range up to 10 micrometer or even higher, for example 50-100 micrometers. The particle size distribution can be also bimodal or polymodal. For such distributions the fraction having diameter less than 1 micrometer (submicron particles) may be quantitatively dominant. This occurs for example for heavy metals such as cadmium, copper and chromium.

It is also known that regulations in force in various countries, for example in Europe, require that in the flue gas released into the environment, heavy metals and/or their compounds, no matter their particle size, be present in very reduced amounts. As said, the European regulation EC 2000/76 sets the more stringent limits. Furthermore, it is prudent to view these limits in a dynamic scenario. Concerns come from recently published data pointing out the pathogenic effect of submicron particulate of heavy metals. As a matter of fact said issue has been the object of scientific studies from years. Said studies indicate that, the smaller are the particles, the more marked the potentially carcinogenic effect. This may be due to the capability of submicron fly ashes to enter the pulmonary alveoli and to remain therein in permanent contact with the internal cellular membranes.

For this reason the environmental agencies, as the American EPA, are committed to define new safety standards introducing new more strict regulations which take into account not only the overall weight concentration per cubic meter, but also the particle size.

It is known in the prior art that particles of heavy metal compounds having diameter larger than 10 micrometers can be removed from flue gas by physical means, for example by filtration. Generally in the filtration processes fabric filters (impact filtration) are used. Often they are operated with a precoat of milled active carbon having a granule size of 20 micrometers. Impact filtration of flue gas can be followed also by electrostatic filtration. In any event, with these combined techniques the separation efficiency is not high, since in the flue gas can be left residual fly ash up to a concentration of 10 mg/Nm$^3$. Moreover, it is necessary to remark that these techniques leave unaltered the entire particulate population with diameter smaller than 5 micrometer, in particular lower than 2.5 micrometer. By the way we remark also the portion of heavy metal entrapped onto fabric filter is just "transferred" from gaseous emissions to adsorbent carbon. Therefore the issue of heavy metal disposal is shifted to the so produced solid effluent. As a matter of fact it is well known that carbons containing heavy metals and/or their compounds are permanent leachant and therefore their safe landfill disposal is questionable. Strict regulation has recently come into force in Europe to landfill of permanent leachant, both organic and inorganic mats.

Another technique used to separate the particles of heavy metals and/or their compounds from flue gases is the scrubbing of flue gas with acid pH water solutions. In this way heavy metals compounds soluble at acid pH are removed. However, the efficiency of this separation process is poor too, specifically for the removal of the submicron particulate. As a matter of fact as the size of the particles decreases, the scrubbing process capability to transfer them to the aqueous phase, no matter if they are soluble or insoluble heavy metal species, it is drastically reduced. Therefore this technique obtains a partition only of heavy metals between flue gases and the acidic washing solution. In addition, the amount of heavy metals transferred to the acid solution can turn to be still a problem, since heavy metal-containing washing solution requires specific treatments before disposal.

It is also known in the prior art that heavy metals can be removed from water solutions by adsorbing resins, for example those proposed by the resin producers for removing water soluble heavy metal compounds, for instance cationic resins and chelant resins. However, it is well known that fossil fuels and wastes contain in general alkaline metals such as for example Na, K and alkaline-earth such as Ca, Mg. These metals are always present in the relevant flue gases in variable, however never negligible, amount and they negatively influence the cationic and chelant resin efficiency or even they can permanently deactivate them. Said ion exchange process has the further drawback to require therefore a frequent regeneration, and spent resin disposal.

It is also known in the prior art the problem associated to the removal from flue gas originated by high temperature combustion processes. In this case flue gas contains heavy metals and/or their compounds which have been subjected to the so called sintering process which transform ordinary soluble heavy metal species into ones partially or totally insoluble in an aqueous phase. For example it is well known that Lead oxide is easily and completely soluble in acid or basic aqueous phase. However lead oxide contained in flue gases coming from combustion processes performed at temperature in the range 850° C.-1,100° C. or higher, and that therefore has been subjected to the sintering process, it becomes poorly soluble in an acid or basic aqueous phase. Therefore in this case, if the sintered Lead oxide particulate is smaller than 10 micrometer, it is practically impossible to remove said oxide from flue gas. Other sintered oxides, such as for example tin, molybdenum, manganese, nickel and chromium, cannot be removed by treating the flue gases with acid pH aqueous solutions too.

Furthermore it is also to be considered the physical state in which the heavy metals and/or their derivatives, in particular their oxides, may be present in the flue gas. For example in fly ash a heavy metal oxide salt can be contained as a solid or as a liquid or as a vapour at the combustion temperature in flue gas. When flue gas is cooled, heavy metal oxides or their salts show different behaviours. For example cadmium oxide solidifies nucleating on itself only, in particles of size smaller than 10 micron, generally lower than 1 micron. As said, it is very difficult to remove particles of so a small size from the flue gas by using known techniques.

Other heavy metal species, for example copper species, give bimodal distribution of particle size, ranging from submicron values to 10 micrometer and even larger. Of course the submicron fraction of said particles undergoes the same drawbacks mentioned above.

Vanadium oxide has a multiple behaviour, since it collapses on itself giving bimodal or polymodal distribution on heterogeneous particles. Further it also deposits onto the walls of the thermal-energy recovery equipments when combustion gases come into contact with the walls of said equipments and the temperature is lower than 700° C. Vanadium oxide partially remains stuck onto equipment walls, thereby causing serious damages. In part vanadium oxide escapes from fumes treatment systems under the form of thin (submicron) fly ashes.

It is also known the patent application JP 9220437 which describes a process for the disposal of exhaust gas of an incinerator wherein the gas is cooled, filtered and let in contact-absorb in slaked lime in the presence of a fixative for heavy metals. In this way both the gas acidity (HCl) and the cadmium and lead content are reduced. The example of said patent application illustrates that the lead removal is only partial.

Patent application US 2006/0099902 describes a process for treating combustion gas wherein most of the heavy metals are removed. Heavy metals are present in said gas in the vapour state. The flue gas is formerly mixed with an air stream and subjected to the treatment for the removal of nitrogen oxides $NO_x$. Then it is cooled through heat exchangers to a temperature between 75° C.-110° C., allowed to pass through a dust collector, and at the end it is contacted with an acid pH liquid adsorbent. In the latter step fumes desulphurization all in one with heavy metals removal take place. The examples of this patent application relate to the mercury removal from combustion gases. The removal of the metals present in the form of solid particles, in particular submicron particulate, is not described.

It was desirable to have available an industrial process which reduces in a substantially quantitative way, given the European regulation EC 2000/76 as a reference, in flue gas coming from combustion processes or in synthetic gases heavy metals and/or their derivatives, in particular it was desirable a process to reduce heavy metals and their compounds also in the following cases:
  in flue gas coming from combustion processes at high temperature, for example from 850 to 1,100° C. or higher;
  in flue gas containing particles of heavy metals or their compounds having an average diameter smaller than 10 micrometer, for example preferably between about 10 nanometer and about 2.5 micrometer;
and moreover being such as to prevent dispersion of heavy metals, recovered from flue gas, into the environment and at the same time such as to convert heavy metals into compounds reusable in industrial processes.

It has surprisingly been found by the Applicant a process allowing to solve the above mentioned technical problem.

An object of the present invention is a process for the substantially complete removal, according to the European regulation EC 2000/76, of heavy metals or their compounds, generally heavy metal oxides and salts, in a gaseous, or liquid or solid state, from fumes or flue gases deriving from combustion processes or from synthetic production gases comprising the following steps:
a) optionally, removal, by filtration of flue gases, of solid particles and heavy metal particulate or heavy metal compound particulate having an average diameter greater than 10 micron;
b) flue gas washing with an aqueous phase wherein the heavy metals or their compounds, soluble in said aqueous phase, are converted into anionic compounds, and simultaneously the particles of heavy metals or their compounds which are insoluble in said aqueous phase are wetted, to allow the transfer of them into said aqueous phase;
c) cooling and partial condensation of the water vapour contained in the flue gas, separation of a condensed aqueous phase, optionally recycling the condensed phase to the combustion chamber (combustor);
d) discharge into the environment of flue gas substantially free from heavy metals or their compounds.

The aqueous phases obtained in the process of the invention can be treated for removing the heavy metals or their compounds therein contained. This can be carried out for example by the following steps:
e°) optionally, separation of the insoluble particulate of heavy metals, or their compounds, from the aqueous phase obtained in step b);

e) treatment of the aqueous phase obtained in b) with anionic exchange resins to remove the heavy metals or their compounds soluble in the aqueous phase;

e') optionally, separation of the insoluble particulate of heavy metals, or their compounds, from the aqueous phase obtained in step e);

f) discharge of the aqueous phase obtained in e') substantially free from heavy metals or their compounds into the environment;

g) optionally, recovery by regeneration of the anionic exchange resins with an aqueous solution.

In step b) in order to verify that the metals or their compounds present in flue gas in the vapour, liquid or solid form, are transformed into anionic compounds soluble in the aqueous phase, or that the heavy metals or their compounds which are insoluble in water have been wetted, the skilled in the art determines the sum of the total heavy metals in the flue gas and the sum of the total metals present in the aqueous solution in the form of anions or of water insoluble heavy metals or their compounds. The two sums must substantially coincide. The characterization of the metals in both cases is carried out by the X-plasma technique. In order to qualitatively determine the wetting of the water insoluble heavy metals or their compounds, the LLS technique (Laser Light Scattering) is applicable to the aqueous solution. To determine the metals in the form of anions, the known methods of the analytical qualitative and quantitative chemistry are used.

By substantially complete removal from flue gases of the particles of heavy metals and/or their compounds according to the present invention it is meant that residual metals (or their compounds) in the flue gas are in an amount lower than 5 μg/Nm$^3$ (normalized), Hg, Cd and Tl excluded. Said limit is of two orders of magnitude lower than the limits of the regulation EC 2000/76. For Hg, Cd and Tl the residual values must each be lower than 0.1 μg/Nm$^3$ (normalized).

More specifically the heavy metals are those comprised in the groups of the periodic table from IIIb to VIIb included, of the VIII group, of the group IIIa: Al Ga In and Tl, of the group IVa: Ge, Sn and Pb, of the group Va: As, Sb, Bi. More specifically the following ones can be mentioned of the group Vb: vanadium; of the group VIb: Cr, Mo; of the group VIIb: Mn; of the group VIII: Co and Ni; of the group Ib: Cu; of the group IIb: Zn, Cd, Hg; of the group IIIa: Tl; of the group IVa: Sn, Pb; of the group Va: As, Sb.

In step a) the removal of the particles of heavy metals or their compounds, having sizes larger than 10 micron, preferably takes place by impact filtration by using for example fabric filters, and/or by electrostatic filtration. Said processes are well known in the art.

In step b) heavy metals or their compounds which are soluble in an aqueous phase are converted into anionic compounds. It has been surprisingly and unexpectedly found that also the water-insoluble heavy metals or their compounds are made wettable by the aqueous solution used in said step, so that they are transferred from the flue gas to the aqueous phase.

With the process of the invention the obtained flue gas are substantially free from heavy metals, or their compounds, as above defined, and therefore can be released to the atmosphere.

By anionic compound of a heavy metal or its compounds, soluble in the aqueous phase of step b) it is meant a compound of an heavy metal having at least one negative charge, for example two negative charges, or more.

In a preferred embodiment, in step b) the aqueous phase used to wash the flue gases comprises, for example, one or more oxidizing agents and one or more acids for the conversion of the heavy metals or their compounds, which are soluble in the aqueous phase into anionic compounds. With reference to this preferred embodiment, step b) is described in detail.

By acid, a substance capable to dissociate hydrogen ions into aqueous solution is meant. The aqueous phase pH value used in step b) is generally between about 0.7 and about 3.3.

The inorganic oxidizing agents generally have an oxidation potential, in acid environment with a pH comprised between 0.7 and 3.3, higher than 0.6 eV, preferably higher than 1 eV, still more preferably higher than 1.5 eV.

Also organic oxidizing agents can be used, which release peroxidic species under the reaction conditions of step b).

The concentration of the inorganic oxidants soluble in the aqueous phase is not particularly critical, generally it is between 0.001 and 1 M, preferably between 0.008 and 0.1 M. As preferred organic oxidizing agents, peroxides, for example peracetic acid and percarbonates, etc. can be used. As preferred inorganic oxidants, hydrogen peroxide, hypochlorous acid, persulphates, $HClO_3$, $HClO_4$, etc. can be mentioned. Optionally, in particular in case of organic oxidants, in order to ease their solution in water, surfactants are added according to known techniques of the prior art. For example the surfactants which can be used are the non-ionic surfactants, for example polyethoxylated surfactants.

From the industrial point of view the surfactants which do not form foam are preferred in order to avoid foaming problems in the flue gas washing equipment, for example in scrubbers. In this case the concentration of the organic oxidants can be for example of about 1 g/litre at room temperature (20-25° C.) in step b).

As particularly preferred inorganic oxidants, hypochlorous acid or its salts, for example sodium hypochlorite, hydrogen peroxide, etc., are used, since easily available on the market at a very low price.

As said, the aqueous phase used to wash the flue gases preferably has a pH lower than or equal to 3.3, more preferably lower than or equal to 2. Also pH lower than or equal to 0.7 can be used, however this is not essential in the process of the present invention. The fact that in the process of the invention also pH of the order of 3.3 can be used represents a remarkable advantage from the industrial point of view. As acid, any acid, both organic and inorganic, can be used, preferably strong acids in aqueous environment are used. Preferably an acid selected from nitric, sulphuric and hydrochloric acid is used. The latter is more preferred since it gives very easily the corresponding anionic compounds of heavy metals or their compounds, which are soluble in the aqueous phase of step b).

When the acids different from hydrochloric acid are used in the aqueous phase, alkaline halide compounds are added to the aqueous phase. The halide can be fluoride, chloride, bromide, iodide. Preferably compounds containing chloride ions, for example NaCl and/or $CaCl_2$, are used. It has been indeed surprisingly and unexpectedly found by the Applicant that the simultaneous presence in said acid aqueous phase of halides together with oxidants makes more easily wettable the heavy metals or their compounds, for example oxides which are water insoluble, also those which are in a partially sintered form. In this way those heavy metals, or their compounds that are insoluble in the aqueous phase of step b), which with the process of the prior art are discharged to the environment through the flue gases or aqueous washing solutions, with the process of the invention they are completely recovered and do not represent a health risk or a risk for the environment. It is well known in fact that the heavy metals enter the food chain and are thus subjected to strict regulations for what concerns the relative amounts that can be discharged into the environment. Besides, when they are in the form of submicron particulate (average diameter lower than 1 micron), they are suspected carcinogenic agents.

In step b) flue gas washing can be performed at temperatures ranging from ambient or room temperature (20-25° C.) up to the limit of the boiling temperature of the aqueous solution at 1 atmosphere pressure. The preferred temperature is between 40° C. and 80° C. Generally the preferred temperature is selected on the basis of the oxidant and of the acid used. The oxidant and the acid must be both present in the reaction aqueous environment at the indicated temperature range.

With the process of the invention, as said, heavy metals, or their compounds, both those soluble in the aqueous phase and those insoluble in the aqueous phase, are removed, even if they are present, wholly or partly, in sintered form. As a matter of fact it is well known that heavy metals, or their compounds, present in flue gases deriving from combustion processes carried out at temperatures higher than 850° C., preferably higher than 1,100° C., they are at least partially in a sintered form. Generally the temperature at which the combustor works ranges from 700° C. to 2,400° C., preferably from 850° C. to 1,650° C.

It has been surprisingly and unexpectedly found by the Applicant that with the process of the invention, by combining steps a) and b), it is possible to substantially remove all the heavy metals, or their compounds, and dispose also the insoluble particles of heavy metals or their compounds, those of submicron size included, down to concentrations (normalized) of at least two orders of magnitude lower than the limits prescribed by the above mentioned European regulation.

As a matter of fact it has been unexpectedly and surprisingly found by the Applicant that with the process of the invention it is obtained the stable transfer to the aqueous phase of particles of heavy metals, or their compounds, which are wholly or partly insoluble in the acid aqueous phase used in step b).

According to a non binding theory of the Applicant, it could be envisaged that, by using an acid and an oxidant, according to a preferred embodiment of the present invention, peroxy compounds and/or of anionic complexes are formed at the surface of the insoluble inorganic particle, wherein the metal is present at its highest oxidation state, said two mechanisms leading to the wettability and to the dispersion into the aqueous phase also of the submicron particulate of heavy metals, or their compounds, insoluble in the aqueous phase of step b). In the processes of the prior art the heavy metal particulate or their compounds having size smaller than 100 nanometer result water insoluble, no matter whether formed of soluble or insoluble species in aqueous phase.

The process of the invention therefore removes, with high efficiency and for a broad spectrum of heavy metals, or their compounds, also inorganic fly ash having submicron size.

In step c) the flue gas treatment is carried out for example in a scrubber, preferably a Ventury scrubber wherein, as scrubbing refrigerating fluid, the condensed phase itself, previously cooled, is used. The cooling/partial steam condensation of step c) increases the removal efficiency of the particulate having submicron size from the flue gases.

Furthermore step e) of the process of the invention shows both high productivity and no clogging and/or resin alteration. This was not predictable, due to the complexity of the metal species present in the flue gases, which can give a wide spectrum of anionic species in the aqueous phase of step b). Step e) can be carried out both in a continuous, for example in column, and in batch fashion (way). The anionic resins used in step e) are not affected by the presence of alkaline and alkaline-earth metals which, as known, are instead deleterious for the cationic and the chelaing resins used in the processes of the prior art for metal uptake.

The anionic exchange resins usable in step e) are for example those described in "Kirk-Othmer—Encyclopedia of Chemical Technology", vol. 14, pages 737-783, J. Wiley & Sons, 1995. Among the preferred anion exchange resins, the resins containing a tertiary or quaternary ammonium group can be mentioned. Among the preferred commercial resins, there are the strong anion ones. Amberjet®44000H (Rohm&Haas) and Dowex®MSA 1-C (Dow) can preferably be mentioned.

The insoluble submicron particulate transferred to the aqueous phase in step b), it is separated therefrom by step e°) or e'). In step e) also the condensed aqueous phase of step c) can likewise be treated. In step e') the separation from the aqueous phase of the insoluble particulate, specifically that having submicron size, it can be carried out by known techniques, for example filtration, preferably in two stages, wherein in the first the particles having average diameter over 0.2 micron, are separated. Alternatively the separation can be carried out by adding flocculants and/or chelants.

As said, the heavy metals which can be removed with the process of the present invention are for example the following ones: mercury, cadmium, copper, nickel, tallium, antimony, arsenic, chromium, cobalt, manganese, vanadium.

In step g) the anion exchange resin used in step e) is regenerated generally using strong acids. Resin regeneration can be carried out with any known process. For example commercial muriatic acid can also be used.

The heavy metals, or their compounds, solubilized in the aqueous phase coming from the regeneration of the anionic exchange resins can be recovered and transformed into the corresponding insoluble non toxic salts, for example as sulphides or carbonates, according to known techniques. For example heavy metal sulphides can be precipitated from the aqueous phase by addition of $H_2S$, after adjusting the pH to acid values to precipitate those metal sulphides precipitating at acid pH. The solution is then filtered, the pH is adjusted to alkaline values to precipitate those heavy metal sulphides which are insoluble in these conditions. It is also possible to invert the precipitation steps. The so obtained heavy metal sulphides are recovered and can for example be used in the metallurgy (industry) of special steels.

The flue gas which can be treated with the process of the present invention are obtainable from combustion processes performed on a variety of combustibles: coal, oil, bituminous schists, but also biomasses, methane, municipal and industrial wastes.

The process of the present invention can also be applied to flue gas deriving from an isothermal reactor without flame front. See for example the reactors described in patent applications WO 2004/094,904 and WO 2005/108,867.

The process of the present invention can also be applied to flue gas coming from a power plant or from an incinerator.

The characterization and determination of heavy metals in the flue gas treated with the process of the present invention has been carried out by using specific sampling and analytical techniques, in particular fly ash sampling with Andersen impactor, particulate characterization with SEM microscopy and chemical analysis with SEM Philips XL30 microscopy, equipped with a thin window EDX system for the microanalysis by energy dispersion spectrometry, by using an automatic system capable to automatically detect the particles when a predetermined threshold is exceeded.

For each of the identified particles the morphology parameters and composition have been determined by measuring the intensity of the characteristic lines of the X ray spectrum and converted into the corresponding atomic concentrations.

As a matter of fact the European regulations require that the flue gases from combustion processes contain very low amounts of metals or their compounds. It has been proposed to further reduce the limits according to said regulations such that the fumes could be defined as "almost free" from heavy metals, or their compounds. In such an instance, characterization techniques, like the ones above described, more sophisticated than the one prescribed by current regulation, should be implemented.

Another preferred embodiment of this invention is relevant to vanadium oxide. As said, it is known that the vanadium oxide present in high concentrations in the combustion gas, for example from oil fractions, tends to solidify onto the walls of the industrial equipments used for the heat recovery from said gas.

In this case the process of the present invention is preferably carried out by injecting in the flue gases, at the combustor outlet, a stream of air containing nanoparticles of an alkaline-earth metal oxide or salt, having generally an average diameter lower than 500 nm, preferably lower than 250 nm, more preferably lower than 100 nm, still more preferably lower than 60 nm. Among oxides, Mgo or CaO, among the corresponding salts, carbonates and alkaline-earth metal chlorides can for example be mentioned. The amount by weight of nanoparticles that is used is very reduced, generally in the order of some hundreds of $mg/Nm^3$ of flue gas. Said nanoparticles are completely absorbed in the aqueous phase of step b). Higher amounts, for example up to $10 g/Nm^3$, can also be used, depending on the vanadium amount to be captured.

It has been found by the Applicant that under these conditions the vanadium compound selectively condenses on the nanoparticles of the alkaline-earth metal oxide or salt, and not on the equipment walls. As said, the nanoparticles of heavy metals or their derivatives are not retained by traditional fabric filter since, as said, have very small sizes, much smaller than 10 micron. With the process of the invention the vanadium or its compounds are deposited onto the surface of the nanoparticles of alkaline-earth metals, and it is recovered along other heavy metals according to the process of the invention, by converting the vanadium or its compounds into the corresponding anion compound.

Therefore it has been surprisingly and unexpectedly found that, unlike the processes of the prior art, with the process of the present invention it is possible to substantially remove from the exhaust gas also the nanoparticles of vanadium or its compounds. Therefore it has been found a solution to the technological problems caused by the chemical aggressiveness of vanadium (vanadates), which as said above would otherwise condense on the walls of the equipments of heat recovery sections. In the prior art this problem is instead kept under control by injections in the combustion gas of large amounts of MgO (average particle sizes about 20 μm)) milled and dispersed in the hot gases. The drawback of this technique is that by-product filtrates containing vanadium difficult to dispose of (known as vanadium muds) are obtained. Said prior art processes were however ineffective for the nanoparticles of vanadium oxide remaining in the flue gases which, as known, are not filterable. The process of the Applicant on the contrary does not expose equipments to the vanadium corrosion and at the same time allows to recover vanadium as raw material for industry, and therefore it is suitable also for fumes generated by high vanadium content combustibles.

A further object of the present invention is represented by exhaust gas from combustion plants, obtainable with the process of the invention. The exhaust gases derive from combustion plants using fuels containing heavy metals. The exhaust gas, from combustion plants using fuels containing heavy metals, contain a total amount of heavy metals lower than about 5 $\mu g/Nm^3$ and higher than about 0.01 $\mu g/Nm^3$ and are obtainable with the process of the invention. The gas obtainable with the process of the present invention from combustion plants, using fuels containing heavy metals, preferably contain a total amount of heavy metals lower than 0.1 $\mu g/Nm^3$. The exhaust gas is obtainable with the process of the present invention from combustion plants using fossil fuels, preferably coal, oil, natural gas, fuel oils, heavies derived from crude refining, bituminous scists, as well as non fossil fuels, preferably biomasses, municipal or industrial wastes.

It is a further object of the present invention the discharged aqueous phase deriving from the post-treatment of gas, from combustion plants, according to the present invention.

For the standard characterization of heavy metals the methods indicated in the European provision EN 14385, February 2004 are used. For Hg, the European provision EN 13211, February 2003 is used.

EXAMPLES

Analytical Methods

Particulate Characterization

The particulate contained in the combustion gases is collected by an impactor of the Andersen Mark III type equipped with a pre-separator (cyclon) capable to remove particles having aerodynamic diameter greater than 10 μm, Andersen impactor screens PM 10 particulate, by using a sampling flow of 14 litres/min, and filters capable to isolate fractions with aerodynamic particle diameter between 10-9 μm; 9-5.8 μm; 5.8-4.7 μm; 4.7-3.3 μm; 3.3-2.1 μm; 2.1-1.1 μm; 1.1-0.7 μm; 0.7-0.4 μm.

The particulate having particle sizes smaller than 0.4 μm, that is not retained in the last stage of the Anderson impactor, it is filtered on a mica filter for the analysis by the atomic force microscope by means of a pneumatic actuator that collects, by thermophoretic effect, a sufficient and statistically significant number of particles. The gaseous stream escaping the impactor is then conveyed into a condensation system of the combustion vapour, wherein the submicron particulate is collected, together with a portion of particulate having a particle diameter smaller than 10 nm in a quantity comprised between 1% and 10% by weight of the original nanometer size population.

The sampling step makes available particulate fractions which are then subjected to chemical-physical analysis by scanning electronic miscroscopy (SEM) and to X-ray analysis. The chemical analysis of the single particles is carried out with a SEM Philips XL30 microscope, equipped with a thin window EDX system for the microanalysis by energy dispersion spectrometry, by using an automatic system capable to automatically detect the particles when a predetermined threshold is exceeded.

For each of the identified particles the morphological parameters and the composition are determined by measuring the intensities of the characteristic lines of the X-ray spectrum and converted into the corresponding atomic concentrations.

The metal analysis is carried out by plasma-induced spectroscopy by using the ICP-OES apparatus by Thermo Electron Corporation.

The chemical potential (eV) of the solutions is determined by a potentiometer.

Example 1 Comparative

A 5 MW thermal, isothermal flameless combustor, working at a temperature of 1900° K and at a pressure of 3 Bar, it is fed with a fuel waste composed by mixed spent solvents, containing 7% by weight of dispersed solids, at a flow-rate of 750 Kg/hour. The combustor produces 3050 kg/hour of fumes which are filtered on fabric filter.

The particulate analysis performed downstream the filters gives the following concentrations of heavy metals (average of 3 running days, sampling every 8 hours, normalized values):

|    | $\mu g/Nm^3$ |
|----|-------|
| Cr | 166.8 |
| Ni | 131.6 |
| Mn | 67.5  |
| Cu | 38.2  |
| Pb | 34.7  |
| V  | 2.9   |
| Ti | 1.8   |
| Se | 0.18  |
| Co | 0.62  |
| Hg | 11.0  |
| Cd | 8.6   |

Example 2

One operates with the combustor of the Example 1 with the same set of operational parameters and using as fuel the same industrial waste. Downstream of the fabric filter and before the sampling, a Venturi-Scrubber with external cooling circuit is inserted. The Venturi-Scrubber operates with a pH 2 aqueous solution having oxidizing power of 1.6 eV, said aqueous solutions obtained by feeding commercial hydrochloric acid (title 33% by weight) and commercial $H_2O_2$ at 30% by weight. The Venturi-Scrubber has a first compartment wherein the flue gas is contacted with the aqueous solution, the flue gas being cooled from 180° C. to 75° C. thereby causing a partial condensation of the water vapour contained in said gases.

The gas analysis downstream of the Venturi-Scrubber, by effecting the sampling and the analysis as reported in the example 1, has shown the following normalized concentrations of heavy metals:

|    | $\mu g/Nm^3$ |
|----|-------|
| Cr | 2.1   |
| Ni | 1.1   |
| Mn | 0.2   |
| Cu | <0.1  |
| Pb | <0.1  |
| V  | <0.1  |
| Ti | <0.1  |
| Se | <0.1  |
| Co | <0.1  |
| Hg | <0.01 |
| Cd | <0.01 |

The characterization of heavy metals have been performed using also, for comparison purposes, the filtration methodology followed by water/damping condensation (Standard UNI 14385). The results thus obtained are substantially aligned with those reported above.

These data show that the total amount of the heavy metals, Mercury and Cadmium excluded, is lower than the limit of the regulation EC 2000/76 of two orders of magnitude. Also Mercury and Cadmium are present in an amount far lower than the limit prescribed by the above mentioned European regulation. Therefore fumes containing metals at this concentration level can be released to the atmosphere with a very reduced environmental impact.

It is observed that the environmental impact of fumes released as per example 1 comparative is definitely higher, though concentrations are within limits provided for by the regulation.

Example 3

The working solution obtained after contact with fumes of example 2, relevant to each running period of 24 hours, it is filtered on a filter having porosity of 0.2 μm in PTFE. The filtrate is then percolated on Dowex MSA 1-C anion exchange resins and the eluate subjected to X-plasma analysis by ICP-OES Thermo Electron Corporation.

The following results were obtained:

|                | |
|----------------|-----------|
| Cr             | 0.3 μg/lt |
| Ni             | 0.4 μg/lt |
| Other elements | <0.1 μg/lt. |

Therefore the eluate can be discharged into the sewer network since the amounts of the metals are within limits provided for by the regulations for this type of effluents.

The used PTFE filter Cartridge is then treated with the nitric-hydrochloric mixture, and then with soda to solubilize the filtrate. The obtained solution is analyzed by X-plasma by ICP-OES Thermo Electron Corporation. Overall it contains an amount of Cr, Ni and Mn equal to 70-80% of the respective amounts removed from the incoming fumes.

The invention claimed is:

1. A process for the removal of gaseous, liquid and solid heavy metals or their compounds, from fumes deriving from combustion processes or from the production synthetic gas, comprising the following steps:
    a) optionally, removal by filtration of flue gases, of particulate of heavy metals, or their compounds, having an average diameter larger than 10 micron;
    b) flue gas washing with an aqueous phase wherein the heavy metals or their compounds, soluble in said aqueous phase, are converted into anion compounds and simultaneously the particles of heavy metals or their compounds which are insoluble in said aqueous phase are wetted, to allow the transfer of them into said aqueous phase;
    c) cooling and partial condensation of water vapour contained in the flue gas, separation of a condensed aqueous phase, optionally recycling the condensed phase to the combustion chamber (combustor);
    d) discharge into the environment of flue gas substantially free from heavy metals or their compounds.

2. A process according to claim 1, wherein the temperature in the combustion chamber is higher than 700° C.

3. A process according to claim 1, wherein in step a) the removal of the particles of the heavy metals or their compounds having sizes larger than 10 micron is carried out by impact filtration.

4. A process according to claim 1, wherein in step b) the aqueous phase used for fumes washing comprises one or more oxidizing agents and optionally one or more acid compounds.

5. A process according to claim 4, wherein the oxidizing agents are inorganic or organic oxidizing compounds.

6. A process according to claim 5, wherein the inorganic oxidizing agents have an oxidation potential, in an acid environment with a pH comprised between 0.7 and 3.3, higher than 0.6 eV.

7. A process according to claim 4, wherein the pH of the aqueous phase is between 0.7 and 3.3.

8. A process according to claim 4, wherein the acid used is a strong acid in aqueous environment.

9. A process according to claim 8, wherein hydrochloric acid is used.

10. A process according to claim 4, wherein if acids different from hydrochloric acid are used, halide compounds are added to the aqueous phase, the halide being fluoride, chloride, bromide, iodide.

11. A process according to claim 10, wherein the halide is chloride.

12. A process according to claim 1, wherein step b) is carried out at a temperature from room temperature up to the limit of boiling temperature of the aqueous solution.

13. A process according to claim 12, wherein the temperature is in the range 40° C.-80° C.

14. A process according to claim 1, wherein in step c) the fumes treatment is carried out in a scrubber.

15. A process according to claim 1, wherein the following steps are further carried out:
   e°) optionally, separation of the insoluble particulate of heavy metals, or their compounds, from the aqueous phase obtained in step b);
   e) treatment of the aqueous phase obtained in b) or in e°) with anion exchange resins;
   e') optionally, separation of the insoluble particulate of heavy metals, or their compounds, from the aqueous phase obtained in step e);
   f) discharge of the aqueous phase obtained in e') substantially free from heavy metals or their compounds into the environment;
   g) optionally, recovery by regeneration of the anion exchange resins.

16. A process according to claim 1, wherein in step e) strong anion exchange resin is used.

17. A process according to claim 1, wherein in step f) the heavy metals eluted from the regeneration of the resins of step c) are precipitated under the form of salts, preferably sulphides or carbonates.

18. A process according to claim 1, wherein combustion fumes at the combustor outlet are additivated with an air stream containing nanoparticles of an alkaline-earth metal oxide or salt having particle sizes lower than 500 nm.

19. A process according to claim 18, wherein the weight amount of nanoparticles of alkaline-earth metal oxide or salt is in the order of hundreds of mg/Nm3.

20. Fumes from combustion plants obtainable with the process of claim 1.

21. Fumes, from combustion plants using fuels containing heavy metals, obtainable with the process of claim 1.

22. Fumes, from combustion plants using fuels containing heavy metals, which contain a total amount of heavy metals lower than about 5 µg/Nm$^3$ and higher than about 0.01 µg/Nm$^3$, which are obtainable with the process of claim 1.

23. Fumes, from combustion plants using fuels containing heavy metals, which contain a total amount of heavy metals lower than 0.1 µg/Nm$^3$ which are obtainable by the process of claim 1.

24. Fumes, from combustion plants according to claim 20, wherein as fuel fossil fuels and non-fossil fuels are used.

25. Waste aqueous phase, deriving from the treatment of fumes of combustion plants which are obtainable with the process of claim 1.

26. Fumes, from combustion plants, obtainable with the process of claim 1, wherein as fuel fossil fuels and non-fossil fuels are used.

27. A process for removing at an amount lower than 500 µg/Nm$^3$ total heavy metal content, Hg, Cd and Tl excluded, Hg being lower than 50 µg/Nm$^3$ and the sum Cd+Tl being lower that 50 µg/Nm$^3$, gaseous, liquid and solid heavy metals or their compounds, from fumes deriving from combustion processes or from the production synthetic gas, comprising the following steps:
   a) optionally, removal by filtration of flue gases, of particulate of heavy metals, or their compounds, having an average diameter larger than 10 micron;
   b) flue gas washing with an aqueous phase wherein the heavy metals or their compounds, soluble in said aqueous phase, are converted into anion compounds and simultaneously the particles of heavy metals or their compounds which are insoluble in said aqueous phase are wetted, to allow the transfer of them into said aqueous phase;
   c) cooling and partial condensation of water vapour contained in the flue gas, separation of a condensed aqueous phase, optionally recycling the condensed phase to the combustion chamber (combustor);
   d) discharge into the environment of flue gas substantially free from heavy metals or their compounds.

28. A process for removing at a residual amount lower that 5 µg/Nm$^3$ total heavy metal content, Hg, Cd and Tl excluded, each of Hg, Cd and Tl being lower than 0.1 µg/Nm$^3$, gaseous, liquid and solid heavy metals or their compounds, from fumes deriving from combustion processes or from the production synthetic gas, comprising the following steps:
   a) optionally, removal by filtration of flue gases, of particulate of heavy metals, or their compounds, having an average diameter larger than 10 micron;
   b) flue gas washing with an aqueous phase wherein the heavy metals or their compounds, soluble in said aqueous phase, are converted into anion compounds and simultaneously the particles of heavy metals or their compounds which are insoluble in said aqueous phase are wetted, to allow the transfer of them into said aqueous phase;
   c) cooling and partial condensation of water vapour contained in the flue gas, separation of a condensed aqueous phase, optionally recycling the condensed phase to the combustion chamber (combustor);
   d) discharge into the environment of flue gas substantially free from heavy metals or their compounds.

29. Fumes from combustion plants obtainable with the process of claim 27.

30. Fumes from combustion plants obtainable with the process of claim 28.

31. A process according to claim 6, wherein the inorganic oxidizing agents have an oxidation potential higher than 1 eV.

32. A process according to claim 6, wherein the inorganic oxidizing agents have an oxidation potential higher than 1.5 eV.

33. A process according to claim 18, wherein the nanoparticles particle sizes are lower than 500 nm.

34. A process according to claim 18, wherein the nanoparticles particle sizes are lower than 250 nm.

35. A process according to claim 18, wherein the nanoparticles particle sizes are lower than 100 nm.

36. A process according to claim 18, wherein the nanoparticles particle sizes are lower than 60 nm.

37. Fumes, from combustion plants according to claim 24, wherein the fossil fuels are selected from the group consisting of coal, oil, natural gas, fuel oils, heavies derived from crude refining, and bituminous scists, and wherein the non-fossil fuels are selected from the group consisting of biomasses, and municipal or industrial wastes.

38. Fumes, from combustion plants, obtainable with the process of claim 26, wherein the fossil fuels are selected from the group consisting of coal, oil, natural gas, fuel oils, heavies derived from crude refining, and bituminous scists, and wherein the non-fossil fuels are selected from the group consisting of biomasses, and municipal or industrial wastes.

* * * * *